US006964432B2

(12) United States Patent
Morita et al.

(10) Patent No.: US 6,964,432 B2
(45) Date of Patent: Nov. 15, 2005

(54) AUTOMOTIVE STEERING SYSTEM

(75) Inventors: Masaki Morita, Saitama (JP); Akira Mitsunaga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/212,013

(22) Filed: Aug. 1, 2002

(65) Prior Publication Data

US 2003/0164608 A1 Sep. 4, 2003

(30) Foreign Application Priority Data

Aug. 7, 2001 (JP) ......................................... 2001-239381

(51) Int. Cl.[7] ................................................. B62D 1/18
(52) U.S. Cl. ......................................... 280/775; 74/493
(58) Field of Search .............................. 280/775, 777, 280/779; 74/492, 493

(56) References Cited

U.S. PATENT DOCUMENTS

| | | | | |
|---|---|---|---|---|
| 3,329,040 A | * | 7/1967 | Stein | 74/493 |
| 4,018,101 A | * | 4/1977 | Mihalic | 74/493 |
| 4,530,254 A | | 7/1985 | Toyoda et al. | |
| 4,554,843 A | * | 11/1985 | Andersson | 74/493 |
| 4,722,241 A | * | 2/1988 | Yoshida et al. | 74/493 |
| 4,958,852 A | * | 9/1990 | Kohno et al. | 280/775 |
| 5,115,691 A | * | 5/1992 | Beauch | 74/493 |
| 5,439,252 A | * | 8/1995 | Oxley et al. | 280/775 |
| 6,189,405 B1 | * | 2/2001 | Yazane | 74/493 |
| 6,241,284 B1 | * | 6/2001 | De Verdier et al. | 280/777 |
| 6,272,945 B1 | * | 8/2001 | Jolley | 74/493 |
| 6,324,935 B1 | * | 12/2001 | Schoen et al. | 74/493 |
| 6,375,220 B1 | * | 4/2002 | Kamm | 280/777 |
| 6,543,807 B2 | * | 4/2003 | Fujiu et al. | 280/775 |
| 6,688,644 B2 | * | 2/2004 | Tsunoda et al. | 280/777 |
| 2002/0171235 A1 | * | 11/2002 | Riefe et al. | 280/775 |

FOREIGN PATENT DOCUMENTS

| | | |
|---|---|---|
| GB | 2 087 808 | 7/1982 |
| GB | 2 113 164 A | 8/1983 |
| JP | 60-236875 | 11/1985 |
| JP | 2000-016303 | 1/2000 |
| JP | 2000-016306 | 1/2000 |
| JP | 2001-233222 | 8/2001 |

* cited by examiner

Primary Examiner—Paul N Dickson
Assistant Examiner—Laura B. Rosenberg
(74) Attorney, Agent, or Firm—Carrier, Blackman & Associates, P.C.; Joseph P. Carrier; William D. Blackman

(57) ABSTRACT

An automotive steering system includes a movable bracket attached to a stationary bracket via a connecting mechanism so as to move back and forth in an axial direction of a steering shaft, a steering column attached to the movable bracket and the steering shaft rotatably attached to the steering column. The positions of the steering shaft and a steering wheel are adjustable in the axial direction. The connecting mechanism includes a pair of flat pin guide surfaces extending in the axial direction and a connecting pin adapted to be inserted between the pair of pin guide surfaces. The pair of pin guide surfaces are provided at a transverse center of the movable bracket, whereas the connecting pin is provided on the stationary bracket and extends through the flat pin guide surfaces. The connecting pin is guided by the pair of pin guide surfaces to relatively move in the axial direction.

17 Claims, 11 Drawing Sheets

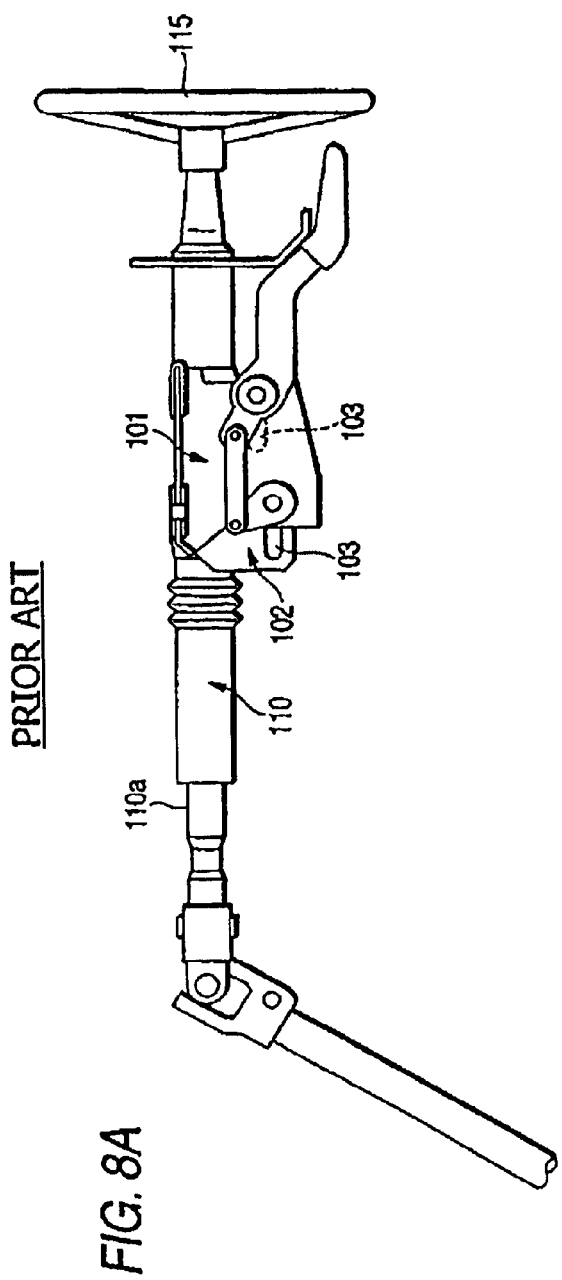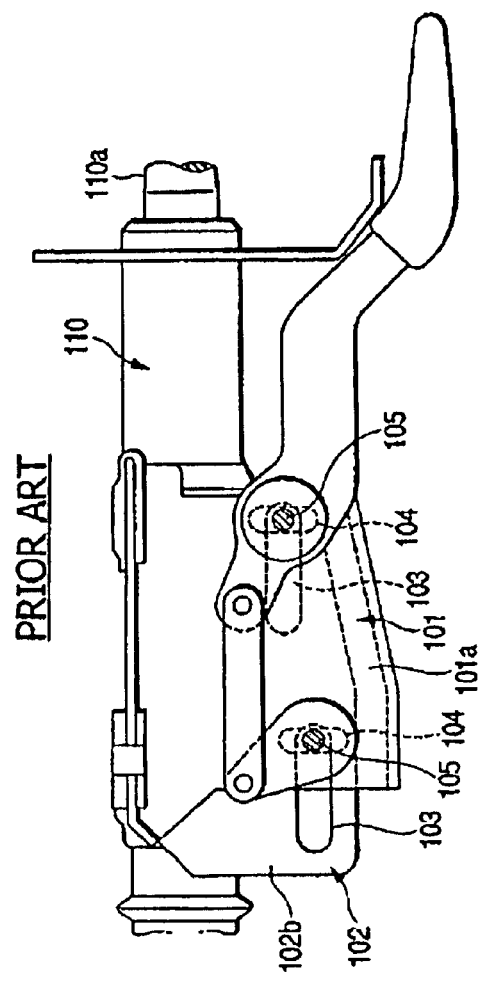
FIG. 8A PRIOR ART
FIG. 8B PRIOR ART

AUTOMOTIVE STEERING SYSTEM

BACKGROUND OF THE INVENTION

1. Field of the Invention

The present invention relates to an automotive steering system, and more particularly to an improved steering shaft attaching construction.

2. Description of the Related Art

In recent years, with a view to allowing the driver to operate the steering wheel in an eased posture, a number of automotive steering systems have been in use in which the position of the steering wheel can freely be changed. In the automotive steering systems of this type, the position of the steering wheel can optionally be changed according to builds of individual drivers, and known is, for example, a "steering wheel position adjusting apparatus" disclosed in JP-A-2000-16306 (hereinafter, referred to as a "related art (1)")

As illustrated in FIGS. 8A to 9, the related art (1) relates to an automotive steering system constructed as follows: A stationary bracket 101 is attached to a body of a vehicle. A movable bracket 102 having a downwardly faced U shape when viewed from the back is attached to the stationary bracket 101 so as to be interposed between a pair of left and right support side plates 101a, 101a of the stationary bracket 101 in such a manner as to move back and forth in axial directions of a shaft member 110a (corresponding to a steering shaft). Further, a steering column 110 is attached to the movable bracket 102, and the shaft member 110a is rotatably attached to the steering column 110. With this structure, the positions of the shaft member 110a and a steering wheel 115 provided on the shaft member 110a can be adjusted in the axial directions of the shaft member 110a.

A specific attaching construction of the movable bracket 102 to the stationary bracket 101 is as follows. Vertically elongate holes 104, 104 extending vertically are formed in the pair of left and right support side plates 101a, 101a of the stationary bracket 101. Horizontally elongate holes 103, 103 extending in the axial direction of the shaft member 110a are formed in a pair of left and right movable support side plates 102b, 102b of the movable bracket 102. Passing a fastening shaft 105 through these horizontally elongate holes 103, 103 and the vertically elongate holes 104, 104 can allow the movable bracket 102 to be attached to the stationary bracket 101 in such a manner as to move back and forth in the axial directions of the shaft member 110a.

According to the related art (1), the horizontally elongate holes 103, 103 formed in the movable bracket 102 can be displaced in the axial directions of the shaft member 110a relative to the fastening shaft 105 provided on the stationary bracket 101. This allows the movable bracket 102 to slide in the axial directions of the shaft member 110a.

However, the steering system disclosed in the related art (1) is constructed such that the fastening shaft 105 is fitted in the pair of left and right horizontally elongate holes 103, 103. The center of the left horizontally elongate hole 103 needs to match the center of the right horizontally elongate hole 103, and the width of the left horizontally elongate hole 103 needs to mach the width of the right horizontally elongate hole 103. Unless the required matching is attained, looseness and prizing are generated between the respective horizontally elongate holes 103, 103 and the fastening shaft 105. In this situation, it is not possible to obtain a smooth adjustment operating feeling when the position of the steering wheel 115 is adjusted. In order to attain the smooth adjustment of the steering wheel position, the dimensions of the left and right horizontally elongate holes 103, 103 need to be properly managed with respect to the center positions and widths thereof, thus increasing man hours for such management.

Furthermore, the thickness of the movable support side plates 102b, 102b is relatively small in which the horizontally elongate holes 103, 103 are formed. Since the movable support side plates 102b, 102b are thin, the contact area between the horizontally elongate holes 103, 103 and the fastening shaft 105 when fitted therein becomes small. As a result of this, since the surface pressure becomes relatively large, a certain consideration needs to be taken against wear.

In addition, the horizontally elongate holes 103, 103 are formed by press stamping, and therefore bars are generated thereon when the holes are so formed. Consequently, a certain consideration also needs to be taken not to produce a bad operation feeling due to prizing that would be generated when the fastening shaft 105 is caused to slide within the horizontally elongate holes 103, 103 in implementing a required adjustment.

In order to solve the above problems, a technology disclosed in JP-A-2000-16303 entitled a "steering system" (hereinafter, referred to as a "related art (2)") may be adopted.

As is illustrated in FIGS. 10 and 11 in the unexamined patent publication, according to the related art (2), a column side bracket 173 having a downwardly faced U shape when viewed from the back is slidably fitted in a body side bracket 172 having a downwardly faced U shape when viewed from the back. Elongate holes 173a, 173b are formed in a pair of left and right side plates of the column side bracket 173, so that frame-like resin sheets 191, 192 are fitted in the elongate holes 173a, 173b, and a bolt 181 on the body side bracket 172 is passed through respective elongate holes in the resin sheets 191, 192.

According to the construction of the related art (2), even if a slight positional and/or dimensional error is generated with respect to the left and right elongate holes 173a, 173b, looseness and prizing that would occur between the bolt 181 and the elongate holes 173a, 173b can be absorbed to some extent.

In the related art (2), however, since components such as the resin sheets 191, 192 and bushes 183, 184 are used, the number of components has to be increased. In the event that the related art (2) so constructed is simply adopted to the related art (1), the construction of an automotive steering system resulting therefrom becomes complicated, and the number of components is increased, which results in an increase in costs. Thus, the simple incorporation of the related art (2) in the related art (1) is not totally advantageous.

SUMMARY OF THE INVENTION

To cope with the problems, an object of the invention is to provide a technology which can provide an automotive steering system at low costs by attaining the smooth adjustment of the position of the steering wheel and easing the management of the dimensions of a connecting mechanism.

With a view to attaining the object, according to a first aspect of the invention, there is provided an automotive steering system in which a movable bracket is attached to a stationary bracket which is attached, in turn, to a body of a vehicle via a connecting mechanism in such a manner as to move back and forth in axial directions of a steering shaft, a steering column is attached to the movable bracket, and the steering shaft is rotatably attached to the steering column, whereby the positions of the steering shaft and a steering wheel which is provided on the steering shaft can be adjusted in the axial directions of the steering shaft, the automotive steering system being characterized in that the connecting mechanism is constructed such that a pair of flat pin guide surfaces extending in the axial direction of the steering shaft are provided at a transverse center of the stationary bracket or the movable bracket and that a connecting pin is provided on the movable bracket or the stationary bracket which is to be inserted between the pair of pin guide surfaces, so that the connecting pin is guided by the pair of pin guide surfaces in such a manner as to be relatively moved in the axial directions of the steering shaft.

The conventional construction is given up in which the connecting pin slides within the left and right elongate holes. Namely, the pair of flat pin guide surfaces are provided at the transverse center of the stationary bracket or the movable bracket (hereinafter, simply referred to as the "bracket"), and the connecting pin is constructed to slide between the pin guide surfaces. Since the connecting pin is caused to slide only between the pair of pin guide surfaces at the transverse center of the bracket, the position of the steering wheel can be adjusted smoothly. Moreover, since the construction is adopted in which the connecting pin is allowed to slide only between the pair of pin guide surfaces at the transverse center of the bracket, the management of the dimensions of the connecting mechanism becomes easy, and the number of man hours required for the dimensional management can be reduced. As a result of this, the automotive steering system can be produced at low costs.

Furthermore, there is no need to provide components for guiding the connecting pin such as bushes. Due to this, the construction of the automotive steering system can be simplified and the number of components can be reduced. Consequently, the automotive steering system can be produced at low costs.

According to a second aspect of the invention, there is provided an automotive steering system in which a movable bracket is attached to a stationary bracket which is attached, in turn, to a body of a vehicle via a connecting mechanism in such a manner as to move back and forth in axial directions of a steering shaft, a steering column is attached to the movable bracket, and the steering shaft is rotatably attached to the steering column, whereby the positions of the steering shaft and a steering wheel which is provided on the steering shaft can be adjusted in the axial directions of the steering shaft, the automotive steering system being characterized in that the connecting mechanism is constructed such that left and right elongate holes extending in the axial direction of the steering shaft and a pair of flat pin guide surfaces extending in the axial direction of the steering shaft between the left and right elongate holes are provided on the stationary bracket or the movable bracket and that a connecting pin is provided on the movable bracket or the stationary bracket which is to be inserted between the pair of pin guide surfaces through the left and right elongate holes, so that the connecting pin is guided by the pair of pin guide surfaces in such a manner as to be relatively moved in the axial directions of the steering shaft.

The pair of flat pin guide surfaces are provided at the transverse center of the bracket, and the connecting pin is constructed to slide between the pin guide surfaces. Since the connecting pin is allowed to slide only between the pair of pin guide surfaces at the transverse center of the bracket, the position of the steering wheel can be adjusted smoothly.

A smooth adjustment operating feeling can be obtained when the position of the steering wheel is adjusted. Moreover, since the construction is adopted in which the connecting pin is caused to slide only between the pair of pin guide surfaces at the transverse center of the bracket, the management of the dimensions of the connecting mechanism becomes easy, and the number of man hours required for the dimensional management can be reduced. As a result, the automotive steering system can be produced at low costs.

Furthermore, there is no need to provide components for guiding the connecting pin such as bushes. Due to this, the construction of the automotive steering system can be simplified and the number of components can be reduced. Consequently, the automotive steering system can be produced at low costs.

According to a third aspect of the invention, a gap between the pair of pin guide surfaces is smaller than the width of the left and right elongate holes.

There is no need to implement a strict management of the dimensions of the left and right elongate holes formed in the stationary bracket or the movable bracket through which the connecting pin is passed. Due to this, machining the elongate holes becomes easy.

According to a fourth aspect of the invention, the pair of pin guide surfaces are surfaces unitized to be formed on a pin guide member, so that a pair of pin guide surfaces are provided on the stationary bracket or the movable bracket by attaching the pin guide member to the stationary bracket or the movable bracket.

The pair of pin guide surfaces can be integrated into the single pin guide member so that they can be produced preliminarily. Due to this, the management of the dimension between the pair of pin guide surfaces can become easier. As a result, the production of the pair of pin guide surfaces becomes easy. The productivity of the automotive steering system can also be increased.

BRIEF DESCRIPTION OF THE DRAWINGS

FIGS. 8A and 8B are side views showing an automotive steering system according to the related art (1);

DETAILED DESCRIPTION OF THE PREFERRED EMBODIMENTS

Figure 1:
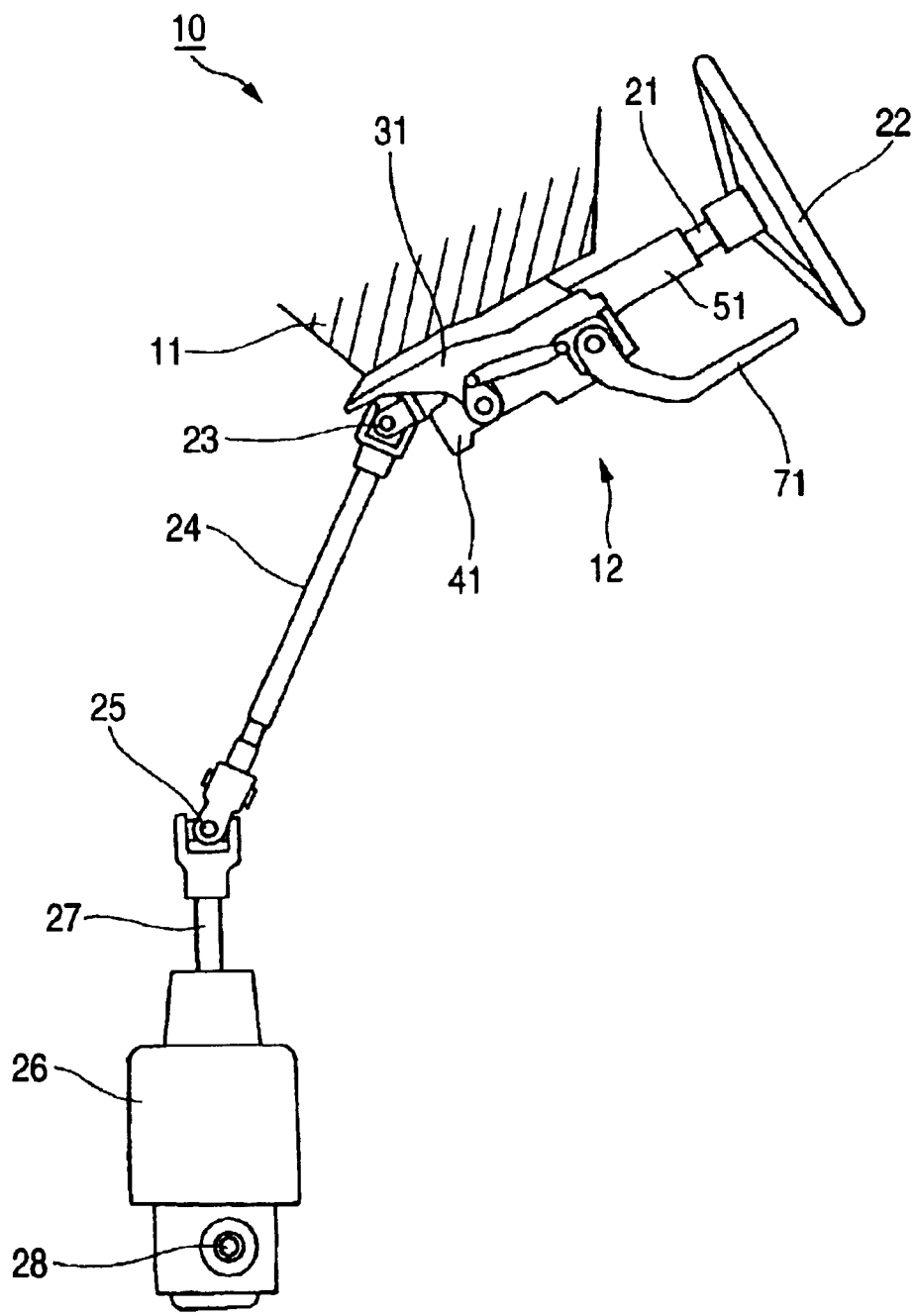
FIG. 1 is a side view showing the overall construction of an automotive steering system according to the invention.

An embodiment of the invention will be described below based on the accompanying drawings. Note that the drawings are viewed in accordance with the orientation of reference numerals given therein.

FIG. 1 is a side view showing the overall construction of an automotive steering system according to the invention, and the automotive steering system 10 of the invention is a steering system in which an upper portion of a column attaching unit 12 is attached to a body 11, a steering shaft 21 is rotatably attached to the column attaching unit 12, a steering wheel 22 is provided at a rear end portion of the steering shaft 21, and an input shaft 27 of a steering gear mechanism 26 is coupled to a front end portion of the steering shaft 21 via a first universal joint 23, an intermediate shaft 24 and a second universal joint 25.

The steering gear mechanism 26 is a gear mechanism in which a rack shaft 28 is connected to the input shaft 27 via a rack-and-pinion mechanism, not shown, and left and right front wheels are connected to ends of the rack shaft 28 via left and right tie rods and knuckles for steering a vehicle.

The front wheels can be steered as required when steering effort exerted on the steering wheel 22 is transmitted to the left and right front wheels along a path constituted in that order by the steering shaft 21, the first universal joint 23, the intermediate shaft 24, the second universal joint 25, the input shaft 27, the rack-and-pinion mechanism, the rack shaft 28, the tie rods and the knuckles.

Figure 2:
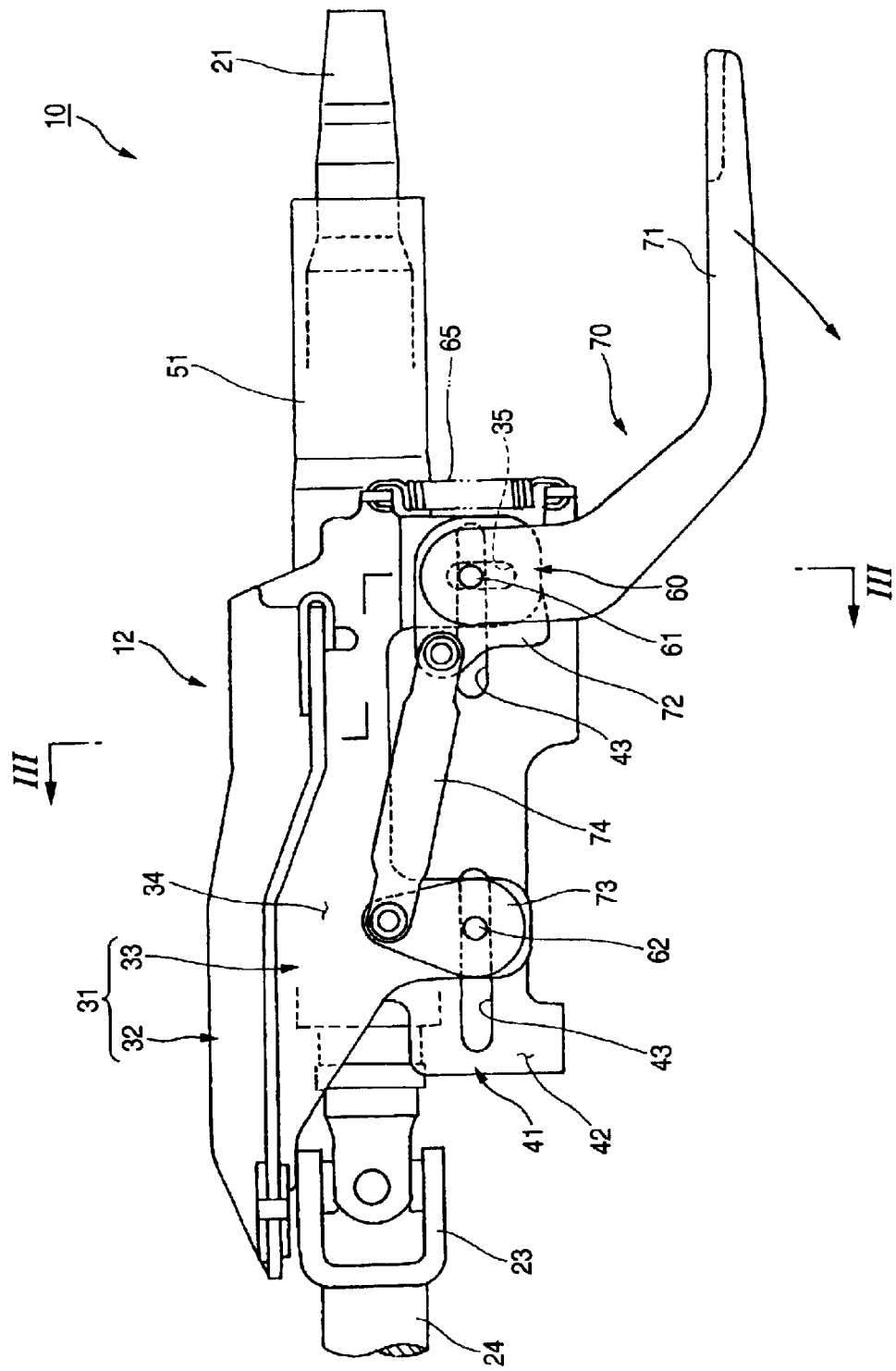
FIG. 2 is a side view of a column attaching unit according to the invention.

FIG. 2 is a side view of the column attaching unit according to the invention. The column attaching unit 12 comprises a stationary bracket 31 attached to the body 11 with bolts at an upper portion thereof (refer to FIG. 1), a movable bracket 41 which is movable relative to the stationary bracket 31, a steering column 51 attached to the movable bracket 41 and a connecting mechanism 60 for attaching the movable bracket 41 to the stationary bracket 31.

The connecting mechanism 60 is constructed such that front and rear two connecting pins (a first connecting pin 61 and a second connecting pin 62) which are arranged in an axial direction of the steering shaft 21 are passed through the stationary bracket 31 and the movable bracket 41, and that the first and second connecting pins 61, 62 are operated to be tightened and/or released by means of a connection manipulating mechanism 70.

The movable bracket 41 can be attached to the stationary bracket 31 via the connecting mechanism 60.

The connection manipulating mechanism 70 is a manipulating mechanism constructed such that a swinging proximal end portion of a manipulating lever 71 is screwed on the first connecting pin 61 and a proximal end portion of a first connecting arm 72 is attached to the manipulating lever 71, and that a proximal end portion of a second connecting arm 73 is screwed on the second connecting pin 62 and the second connecting arm 73 is connected to the first connecting arm 72 with a link 74.

The first and second connecting pins 61, 62 are restricted by a detent member, which will be described later, to prevent the rotation thereof.

When the manipulating lever 71 is swung in a clockwise direction, as illustrated in the figure, the first connecting arm 72 rotates in the same direction. In response to this, the link 74 is displaced, whereby the second connecting arm 73 also rotates in the same direction. Conversely, when the manipulating lever 71 is swung in a counterclockwise direction or an opposite direction to that shown in the figure the first and second connecting arms 72, 73 also rotate in the counterclockwise direction.

The screwing amount of the manipulating lever 71 relative to the first connecting pin 61, as well as the screwing amount of the second connecting arm 73 relative to the second connecting pin 62 can be increased and reduced by rotating the first and second connecting arms 72, 73 in the clockwise and counterclockwise directions by the single manipulating lever 71. A specific construction for increasing and reducing the screwing amounts will be described next with reference to FIG. 3.

Furthermore, the figure shows that a rear end portion of the stationary bracket 31 and a rear end portion of the movable bracket 41 are connected by left and right tension springs 65, 65 (in the figure, only the left tension spring is shown).

Figure 3:
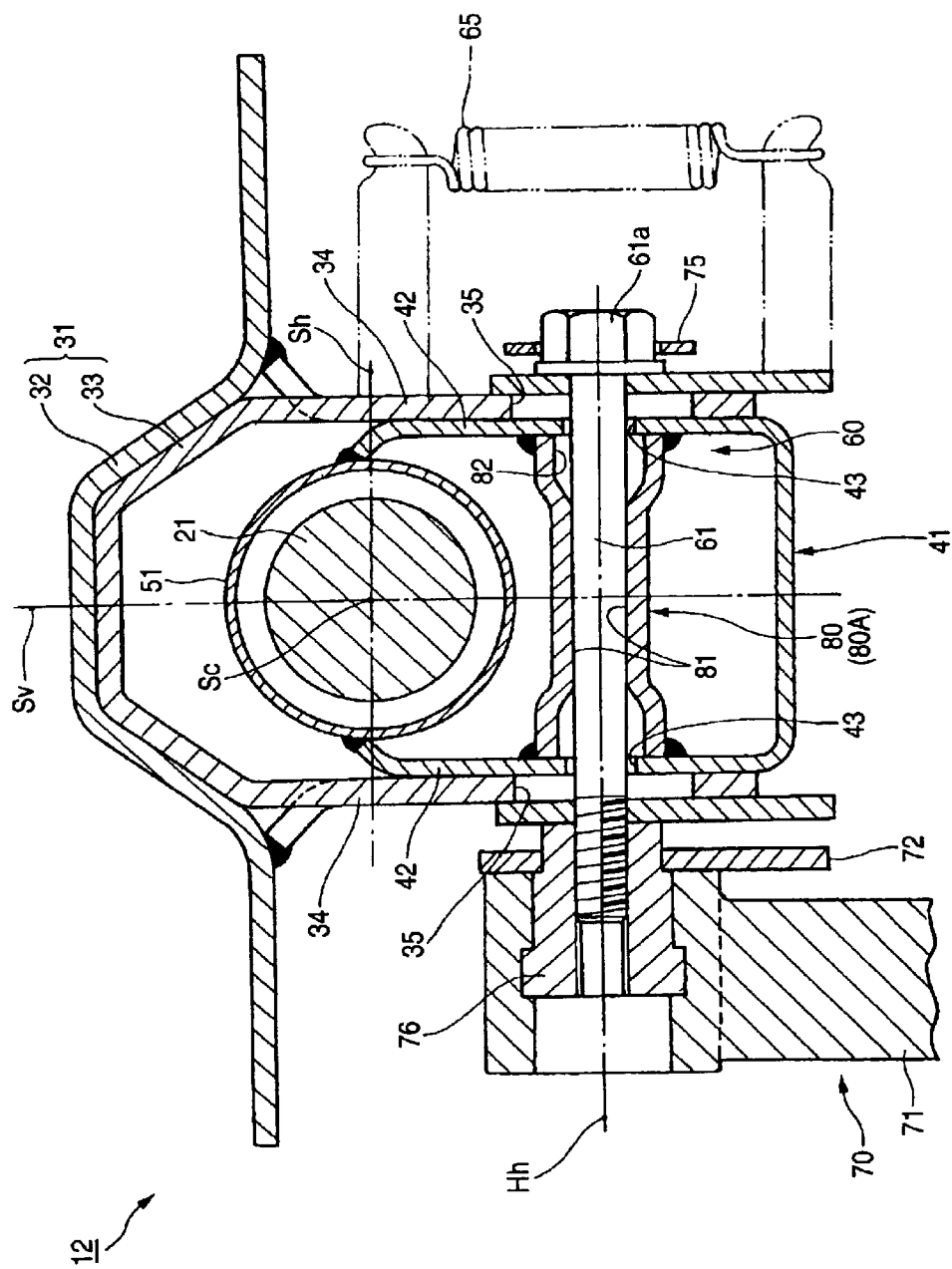
FIG. 3 is a cross-sectional view taken along the line III—III in FIG. 2.

FIG. 3 is a cross-sectional view taken along the line III—III in FIG. 2. The stationary bracket 31 comprises a body attaching member 32 for attaching the stationary bracket 31 to the body and a stationary bracket member 33 joined underneath the body attaching member 32 using welding or the like. The stationary bracket member 33 is a downwardly faced U-shaped member having a pair of left and right support side plates 34, 34 formed integrally therewith in such a manner as to face each other with a certain space being provided therebetween by bending a sheet steel into a downwardly faced U shape as viewed from the back thereof.

The movable bracket 41 is a U-shaped member having a pair of left and right side plates 42, 42 (hereinafter, referred to as "movable side plates 42, 42") formed integrally therewith in such a manner as to face each other with a certain space being provided therebetween by bending a sheet steel into a U shape as viewed from the back thereof.

By fitting the movable bracket 41 between the left and right support side plates 34, 34 in such a manner as to move relatively, respective external sides of the left and right movable side plates 42, 42 are brought into contact with inner sides of the respective support side plates 34, 34.

The steering column 51 can be attached to an upper end of the movable bracket 41 by joining, by virtue of welding or the like, an outer circumferential surface of the steering column 51 to respective upper ends of the left and right movable side plates 42, 42. The steering column 51 is a cylindrical member for rotatably receiving the inserted steering shaft 21 via bearings (not shown).

Furthermore, left and right elongate holes 43, 43 which extend in the axial direction of the steering shaft 21 (in a direction along the front and back sides of the figure) are pierced in the left and right movable side plates 42, 42 in such a manner as to be concentric with each other and to be parallel to a horizontal line Sh passing through a center Sc of the steering shaft 21.

A pin guide member 80 can be attached to the movable bracket 41 by interposing the pin guide member 80 between the left and right movable plates 42, 42 and joining the pin guide member 80 to the movable plates 42, 42 through welding or the like. The pin guide member 80 is a member adapted to be disposed concentrically with a center line Hh of the elongate holes 43 and to have a pair of upper and lower pin guide surfaces 81, 81 formed therein in such a manner as to extend in the axial direction of the steering shaft 21, so that the first connecting pin 61 is inserted between the pin guide surfaces 81, 81. Thus, the pair of flat pin guide surface 81, 81 extending in the axial direction of the steering shaft 21 are provided at the transverse center of the movable bracket 41, and the connecting pin 61 is provided on the stationary bracket 41, and the connecting pin 61 is provided on the stationary bracket 31 for insertion between the pair of pin guide surfaces 81, 81, whereby the connecting pin 61 can be guided by the pair of pin guide surfaces 81, 81 in such a manner as to more relatively in the axial directions of the steering shaft 21. The details of the pin guide member 80 will be described next with reference to FIGS. 4A–4D.

Figure 4B:
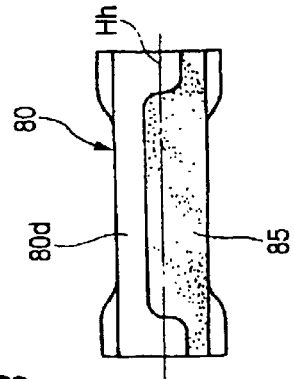
FIGS. 4A–4D are views showing the construction of a pin guide member according to the invention.
Figure 4D:
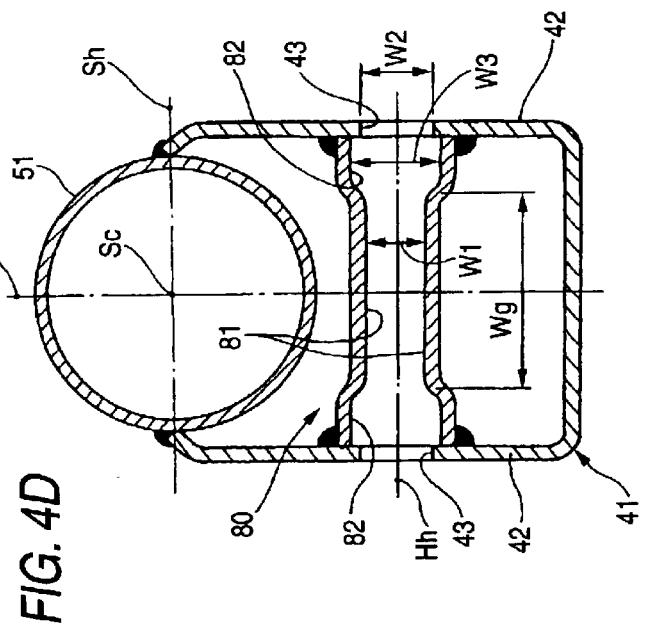
Figure 4A:
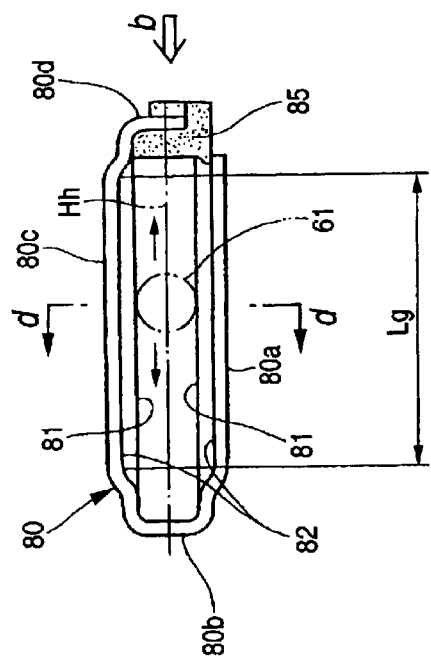
Figure 4C:
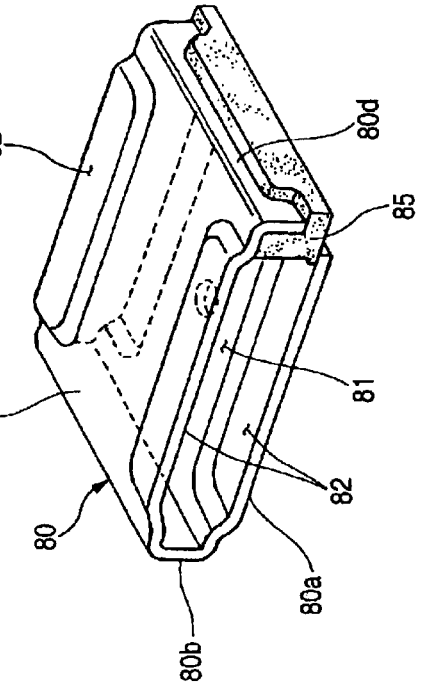

FIGS. 4A to 4C are views showing the construction of the pin guide member according to the invention. FIG. 4A shows a side of the pin guide member 80, FIG. 4B is a view of the pin guide member 80 as viewed from a direction indicated by an arrow b shown in FIG. 4A, FIG. 4C is a perspective view showing the entirety of the pin guide member 80 and FIG. 4D is a cross-sectional view of a construction in which the pin guide member 80 is attached to the movable bracket 41 and corresponds to a cross section taken along the line d-d in FIG. 4A.

As shown in FIGS. 4A and 4C, the pin guide member 80 is formed by bending a sheet steel into a configuration having a flattened O-like shape as viewed from the side which is opened in longitudinal sides thereof and comprises a horizontal bottom plate 80a, an erect plate 80b which erects from an end of the bottom plate 80a, a top plate 80c folded back from an upper end of the erect plate 80b so as to be parallel with the bottom plate 80a and a suspending plate 80d which suspends from an end of the top plate 80c.

Furthermore, an inner side of the top plate 80c and an inner side of the bottom plate 80a are made to be the pair of upper and lower pin guide surfaces 81, 81 so disposed relative to the center line Hh of the elongate holes 43, 43 shown in FIG. 4D which acts as a reference. Thus, the pair of upper and lower pin guide surfaces 81, 81 are provided on the pin guide member 80.

The pair of pin guide surfaces 81, 81 are surfaces unitized to be formed on the single pin guide member 80 in such a manner as to extend in a longitudinal direction of the elongate holes 43 and are also sliding surfaces for guiding the first connecting pin 61 indicated by an imaginary line in FIG. 4A in such a manner that it can move relatively.

As shown in FIGS. 4A and 4D, the pair of pin guide surfaces 81, 81 can be provided between the left and right elongate holes 43, 43. The dimension W1 of a gap between the pair of pin guide surfaces 81, 81 is smaller than the width W2 of the left and right elongate holes 43, 43 (W1<W2). Due to this, the first connecting pin 61 is brought into contact with the elongate holes 43, 43 in no case.

The left and right elongate holes 43, 43 function as a relief or clearance hole for preventing the first connecting pin 61 inserted between the pin guide surfaces 81, 81 from interfering with the movable side plates 42, 42. Since the management of the dimensions of the left and right elongate holes 43, 43 does not have to be implemented in a strict fashion, machining the elongate holes becomes easy. Note that in the event that the first connecting pin 61 is constructed such that the connecting pin 61 does not interfere with the movable bracket 41, the left and right elongate holes 43, 43 become unnecessary.

As shown in FIGS. 4C and 4D, the pin guide member 80 is constructed to be expanded at portions thereof where the pin guide member 80 joins to movable plates 42, 42 using welding or the like. Specifically, expanded portions 82, 82 are formed at portions of the inner sides of the bottom plate 80a and the top plate 80c of the movable bracket 41 which join to the left and right movable side plates 42, 42, and a width W3 between the expanded portions 82, 82 is set larger than the gap W1 between the pin guide surfaces 81, 81 and the width W2 of the elongate hole 43 (W1<W2<W3). Consequently, a heat effect that would be generated when the pin guide member 80 is joined to the movable side plates 42, 42 can be eliminated to an extreme extent. The dimensional accuracy of the gap W1 between the pin guide surfaces 81, 81 and the width W2 of the elongate hole 43 can be maintained.

The length Lg of the pin guide surfaces 81, 81 shown in FIG. 4A is the longitudinal dimension of the movable bracket 41 set properly considering the relative travel amount between the pin guide surfaces 81, 81 and the first connecting pin 61.

The width Wg of the pin guide surfaces 81, 81 or guide width Wg thereof is the transverse dimension of the movable bracket 41 set so that the first connecting pin 61 can be guided in a stable condition. Since the guide width Wg is large, the contact area between the first connecting pin 61 and the pin guide surfaces 81, 81 becomes large. As a result, the surface pressure becomes small and therefore wear is difficult to happen. Hence, the first connecting pin 61 can be guided more smoothly and stably.

Preferably, the surface roughness of the pin guide surfaces 81, 81 is reduced so that the first connecting pin 61 is allowed to slide smoothly.

Furthermore, the pin guide member 80 is provided with a damper member 85 at a longitudinal end of the pin guide surfaces 81, 81. The damper member 85 is a rubber adapted to be elastically deformed when the first connecting pin 61 moves as far as the longitudinal end of the pin guide surfaces 81, 81 to be brought into collision therewith to thereby absorb an impact generated by the collision.

As has been described heretofore, the pair of pin guide surfaces 81, 81 are the surfaces unitized to be formed on the single pin guide member 80, and the pair of pin guide surfaces 81, 81 are designed to be provided on the movable bracket 41 by attaching the pin guide member 80 to the movable bracket 41.

The pair of pin guide surfaces 81, 81 can be preliminarily produced by integrating them onto the single pin guide member 80. Due to this, the management of the dimensions of the pair of pin guide surfaces 81, 81 can be made easier. As a result, the production of the pair of pin guide surfaces 81, 81 can be facilitated further. The productivity of the automotive steering system can also be increased.

Here, returning to FIG. 3, the description of the embodiment will be continued. The first connecting pin 61 has a bolt with a head and is inserted through first holes 35, 35 formed in the left and right support side plates 34, 34, the left and right elongate holes 43, 43 formed in the movable bracket 41, and between the pair of pin guide surfaces 81, 81. The rotation of the bolt with a head (the first connecting pin 61) can be restricted by holding a head portion 61a of the bolt with a head with a detent member 75.

A nut 76 is integrally provided on the manipulating lever 71, and one end portion of the connecting pin 61 is screwed on the nut 76, whereby the first connecting pin 61 is connected to the manipulating lever 71. The screwing amount of the manipulating lever 71 relative to the first connecting pin 61 can be increased and reduced by operating the manipulating lever 71 to swing.

The position of the connecting pin 61 relative to the stationary bracket 31 can be locked by virtue of frictional force by increasing the screwing amount of the manipulating lever 71 to tighten the left and right support side plates 34, 34 by the head portion 61a and the nut 76. In addition, the first connecting pin 61 can be unlocked relative to the stationary bracket 31 by releasing the same support side plates.

In addition, similarly to the first connecting pin 61, the second connecting pin 62 shown in FIG. 2 is constructed to be inserted between a pair of pin guide surfaces 81, 81 and to be connected to the second connecting arm 73 via a nut. Consequently, the second connecting pin 62 can attain the same function as that of the first connecting pin 61.

Figure 5A:
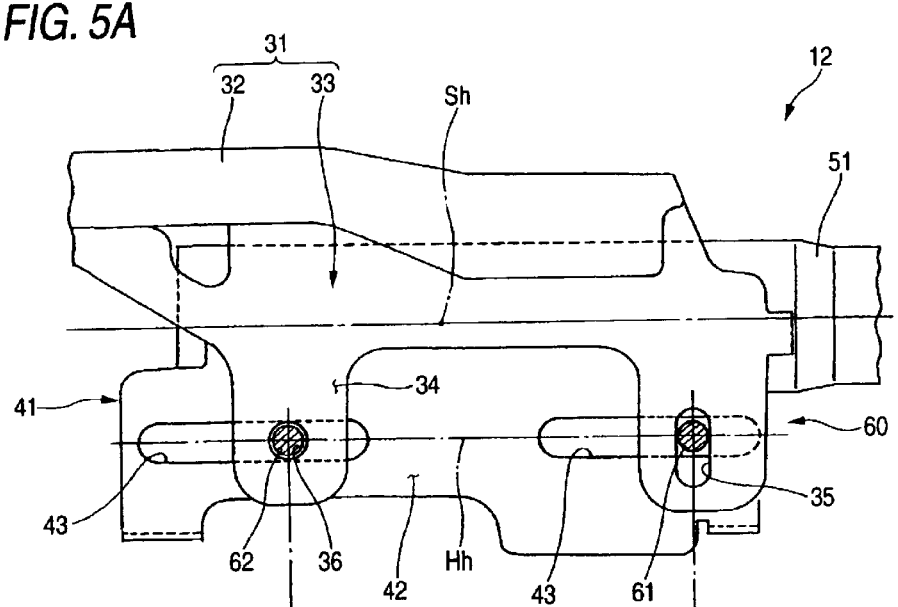
FIGS. 5A–5B are explanatory views showing the relationship between a stationary bracket and a movable bracket both according to the invention.
Figure 5B:
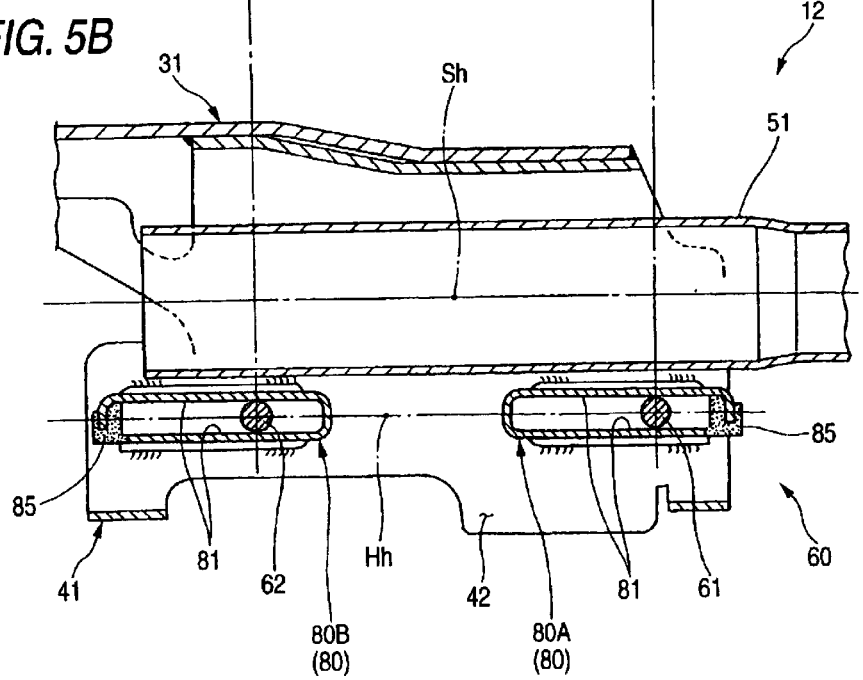

FIGS. 5A and 5B are explanatory views showing the positional relationship between the stationary bracket and the movable bracket according to the invention, in which FIG. 5A is a view showing the construction of the column attaching unit 12 as viewed from the side thereof, and FIG. 5B is a sectional view showing the construction of the column attaching unit 12 as viewed from the side thereof.

As shown in FIG. 5A, the elongate holes 43, 43 in the movable bracket 41 are horizontally elongate holes extending in the longitudinal direction of the steering shaft.

On the other hand, the stationary bracket 31 has the first holes 35, 35 and second holes 36, 36 which are pierced concentrically with the center line Hh of the elongate holes 43, 43 in the left and right support side plates 34, 34 (in this figure, only the left support side plate is shown, which applies hereinafter). The first holes 35, 35 are vertically elongate holes formed in the support side plate 34 on a steering wheel side thereof (on a right-hand side of the figure) or elongate holes which extend vertically in a direction intersecting the center line Hh of the elongate holes 43 at right angles. The second holes 36, 36 are circular holes formed in the support side plate 34 on a steering gear mechanism side thereof (on a left-hand side of the figure)

FIG. 5B shows that front and rear two pin guide members 80 are disposed at the positions of the front and rear elongate holes 43, 43 shown in FIG. 5A. The pin guide members 80, 80 are disposed such that the pin guide surfaces 81, 81 thereof extend in the direction in which the elongate holes 43, 43 extend.

The pin guide member 80 provided on the steering wheel side (hereinafter, referred to as a "first pin guide member 80A") is provided with the damper member 85 at a right end thereof.

The pin guide member 80 provided on the steering gear mechanism side (hereinafter, referred to as a "second pin guide member 80B") is provided with the damper member 85 a left end thereof.

As shown in FIGS. 5A and 5B, the first connecting pin 61 is inserted through the elongate holes 43, the first holes 35 and the first pin guide member 80A, and the second connecting pin 62 is inserted through the elongate holes 43, the second holes 36 and the second pin guide member 80B.

Since the first and second connecting pins 61, 62 fit in the first and second holes 35, 36 on the stationary side, the pins cannot move in the axial directions of the steering shaft.

Here, the description of the connecting mechanism 60 will be summarized. The connecting mechanism 60 according to the invention is characterized in that the pairs of upper and lower flat pin guide surfaces 81 are provided at the transverse center of the movable bracket 41, and that the first and second connecting pins 61, 62 are constructed to slide between the pin guide surfaces 81, respectively.

As a result, since the first and second connecting pins 61, 62 are allowed to slide only between the pair of pin guide surfaces 81 which are formed at the transverse center of the movable bracket 41 at the front and rear ends thereof, respectively, the position of the steering wheel (refer to FIG. 1) can be adjusted smoothly. A smooth adjustment operating feeling can be obtained when adjusting the position of the steering wheel.

Moreover, since the first and second connecting pins 61, 62 are caused to slide only by the pairs of pin guide surfaces 81 formed at the transverse center of the movable bracket 41, the management of the dimensions of the connecting mechanism 60 becomes easy, and the number of man hours required for the dimensional management can be reduced. As a result, the automotive steering system can be produced at relatively low costs.

Furthermore, there is no need to provide components such bushes for guiding the first and second connecting pins 61, 62. Owing to this, the construction of the automotive steering system can be simplified, and the number of components involved can be reduced. Consequently, the automotive steering system can be produced at low costs. Moreover, since no movable components such as bushes formed from resin material or rubber are used at portions where the first and second connecting pins 61, 62 are guided, the durability of the connecting mechanism 60 is increased.

Figure 6:
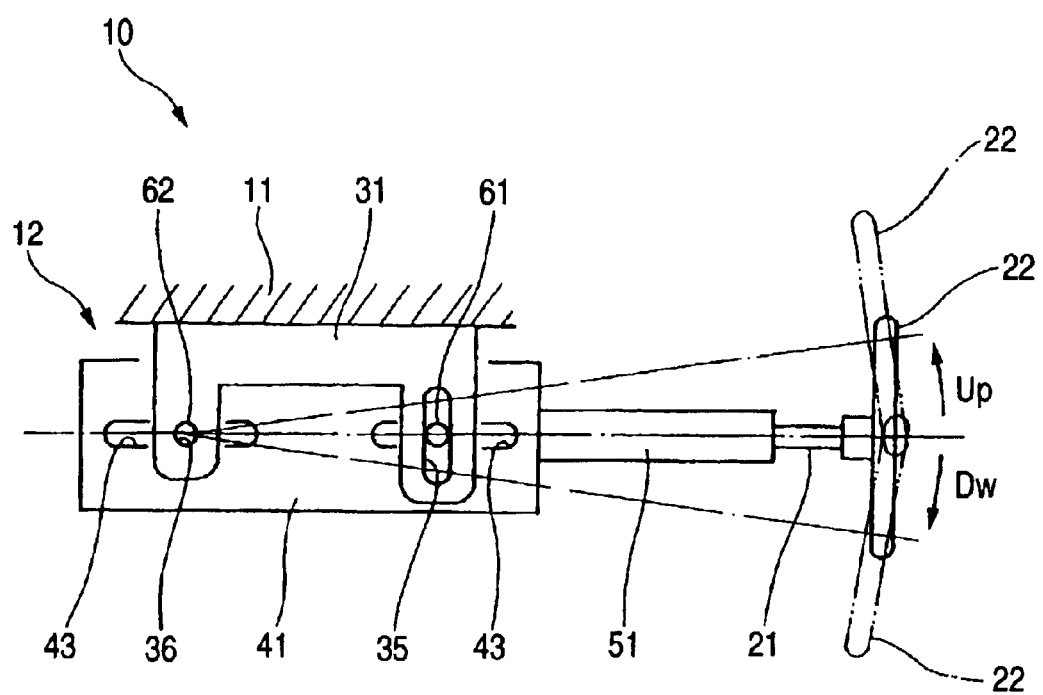
FIG. 6 is a view showing a function of the automotive steering system according to the invention (part 1)

FIG. 6 is a view showing a first function (part 1) of the automotive steering system according to the invention in which the movable bracket 41 is made adjustable vertically in a swinging fashion (or tiltably adjustable) relative to the stationary bracket 31.

When the steering wheel 22 is tilted upwardly as indicated by an arrow Up or downwardly as indicated by an arrow Dw after the first and second connecting pins 61, 62 have been released by the manipulating lever 71 (refer to FIG. 2), the movable bracket 41 tilts vertically about the second connecting pin 62. Consequently, the positions of the steering column 51, the steering shaft 21 and the steering wheel 22 provided on the steering shaft 21 can be adjusted vertically. A vertically adjustable construction like this is designated as a tilt mechanism.

Note that even if the first and second connecting pins 61, 62 are released, the rear end portion of the movable bracket 41 is supported with the tension springs 65, whereby the steering shaft 21 can be held at a substantially neutral position shown in the figure.

Figure 7A:
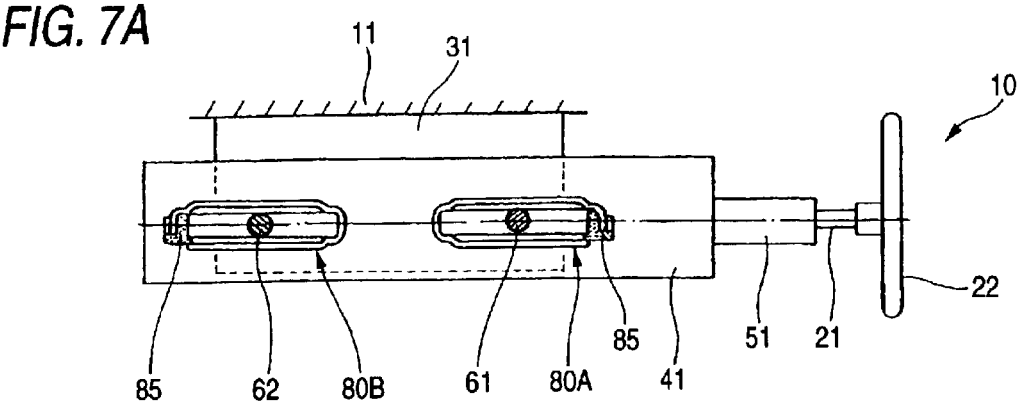
FIGS. 7A–7C are views showing a function of the automotive steering system according to the invention (part 2)
Figure 7B:
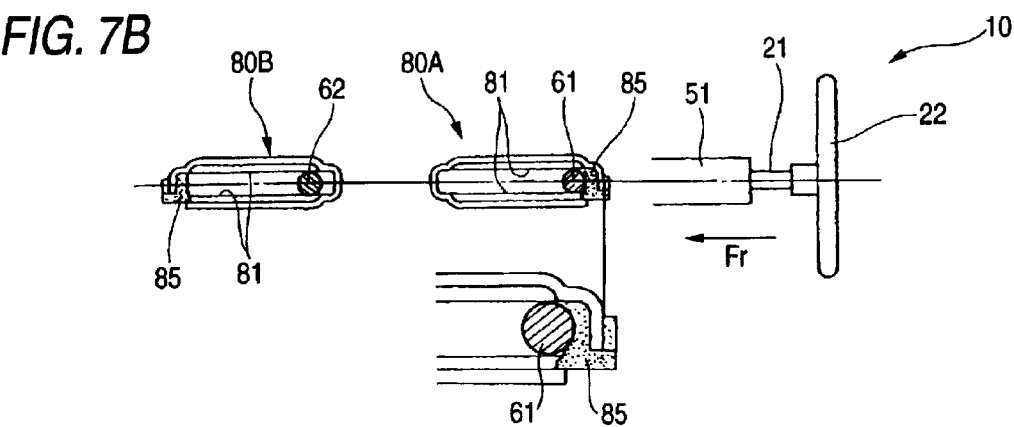
Figure 7C:
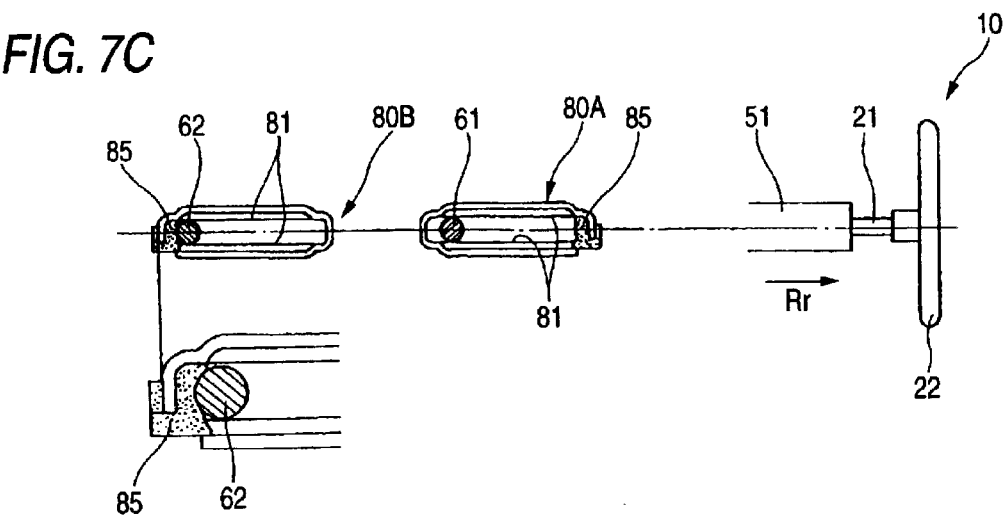
Figure 9:
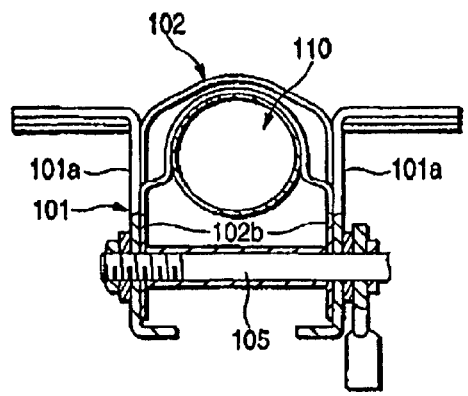
FIG. 9 is a sectional view of a part of a bracket according to the related art (1)
Figure 10:
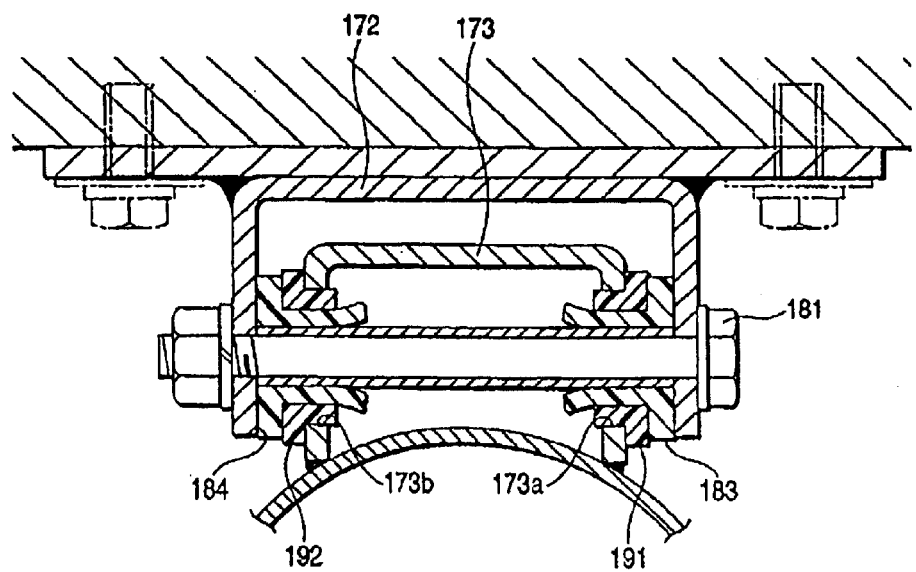
FIG. 10 is a sectional view of a supporting mechanism of the related art (2)
Figure 11:
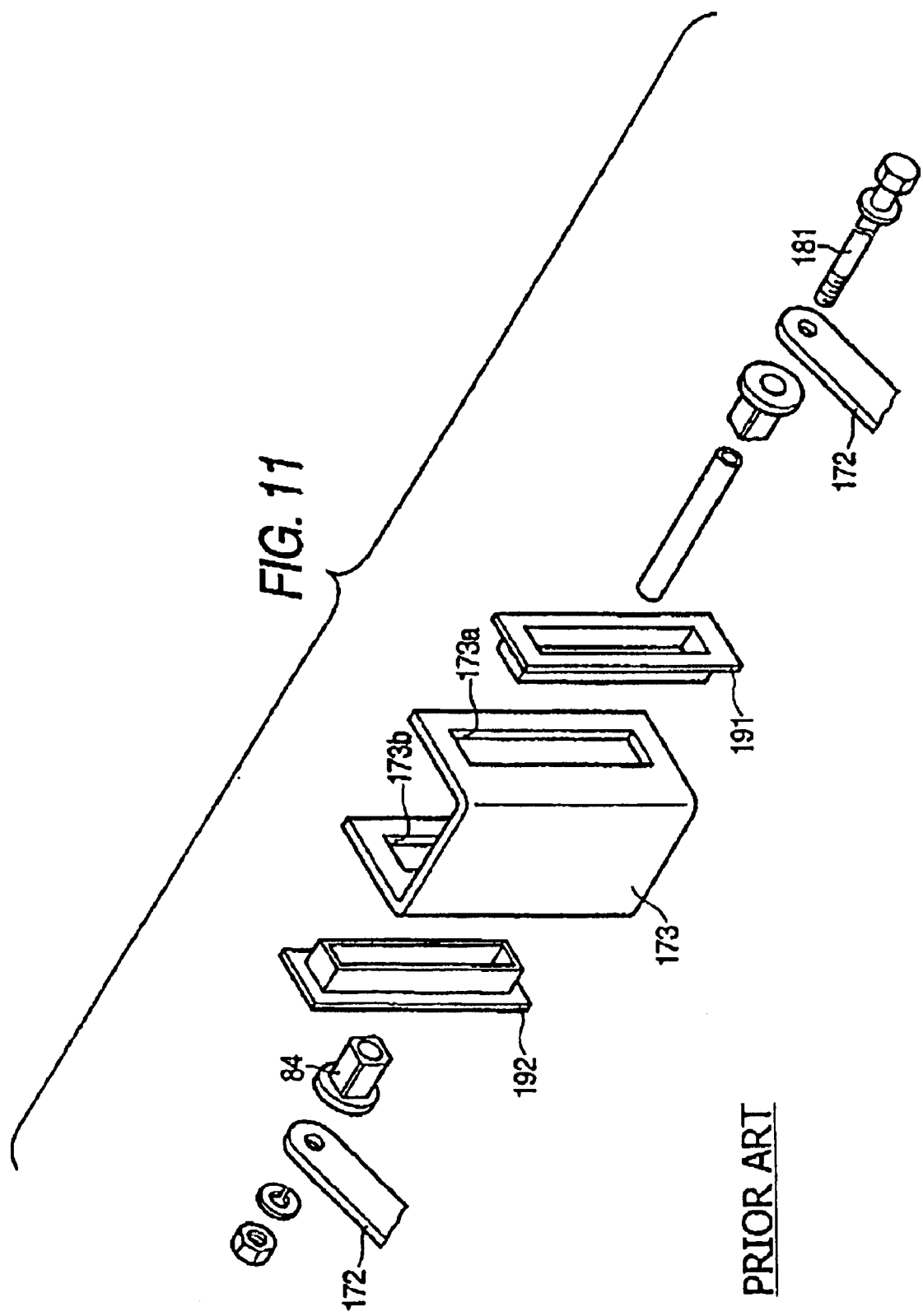
FIG. 11 is an exploded perspective view of the supporting mechanism of the related art (2).

FIGS. 7A to 7C are views showing a second function (part 2) of the automotive steering system according to the invention, in which the movable bracket 41 is made axially adjustable.

FIG. 7A shows that the first and second pin guide members 80A, 80B are situated at an intermediate position relative to the first and second connecting pins 61, 62. As has been described above, the first and second connecting pins 61, 62 cannot be moved in the axial directions of the steering shaft 21.

FIG. 7B shows that the steering wheel 22 is pushed forward as indicated by an arrow Fr after the first and second connecting pins 61, 62 have been released by the manipulating lever 71 (refer to FIG. 2). The respective pin guide surfaces 81 . . . of the first and second pin guide members 80A, 80B provided on the movable bracket 41 move forward as indicated by the arrow Fr relative to the first and second connecting pins 61, 62. Consequently, the positions of the steering column 51, the steering shaft 21 and the steering wheel 22 move forward as indicated by the arrow Fr. When the first pin guide member 80A has traveled to reach its front-most end, the damper member 85 of the first pin guide member 80A collides against the first connecting pin 61.

FIG. 7C shows that the steering wheel 2 is drawn towards a driver side as indicated by an arrow Rr after the first and second connecting pins 61, 62 have been released by the manipulating lever 71. The respective pin guide surfaces 81 . . . of the first and second pin guide members 80A, 80B provided on the movable bracket 41 move toward the driver side as indicated by the arrow Rr relative to the first and second connecting pins 61, 62. Consequently, the positions of the steering column 51, the steering shaft 21 and the steering wheel 22 move toward the driver side as indicated by the arrow Rr. When the second pin guide member 80B has traveled to reach its rear-most end, the damper member 85 of the second pin guide member 80B collides against the second connecting pin 62.

Thus, the positions of the steering shaft 21 and the steering wheel 22 can be adjusted in the axial directions of the steering shaft 21. A back-and-forth adjustable construction like this is designated as a telescopic mechanism.

In addition, the damper members 85, 85 are elastically deformed when the first and second connecting pins 61, 62 collide thereagainst to thereby absorb impacts that would be generated at the time of such collisions. Moreover, the impact force is dispersed to the surroundings by the damper members 85, 85. There is no concern that the damper members 85, 85 come off the first and second pin guide members 80A, 80B.

Figure 12:
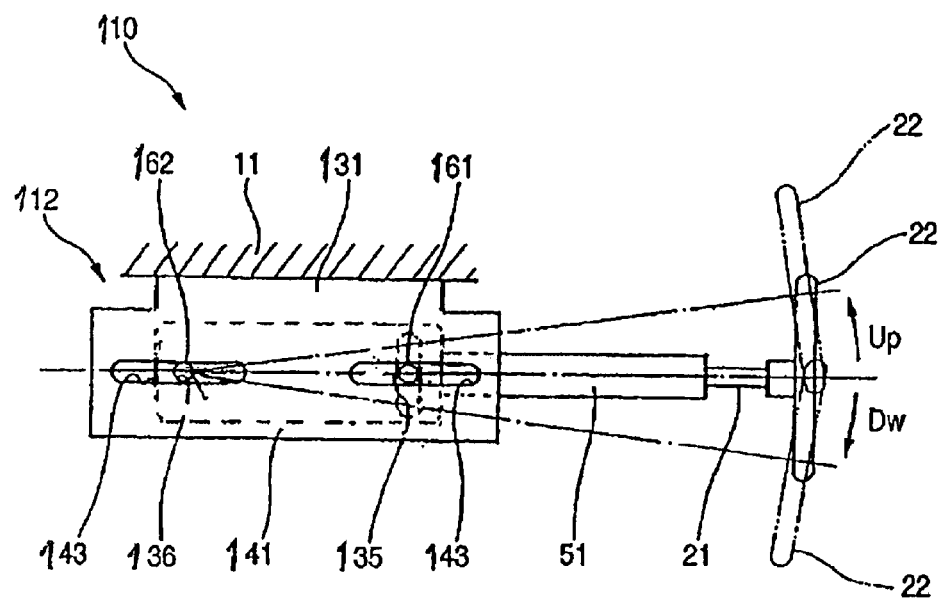
FIG. 12 is a side plan view, partially in section, showing an alternative embodiment of an automotive steering system according to the present invention.

Note that, in an alternative embodiment of an automotive steering system 110 according to the invention, as shown in FIG. 12, in the connecting mechanism according to the alternative embodiment of the invention, the left and right elongate holes 143, 143 and the pair of pin guide surfaces may be provided in the stationary bracket 131 as shown, whereas the connecting pins 161, 162 may be provided on the movable bracket 141.

In addition, the pair of pin guide surfaces 81, 81 may be provided on the stationary bracket 131 by attaching the pin guide member 80 to the stationary bracket 131. Those who are acquainted with the art of automotive steering system manufacture and design will be able to appropriately modify and adapt the above-described structure of the first embodiment, in order to make it work with the embodiment of FIG. 12.

While only certain embodiments of the invention have been specifically described herein, it will apparent that numerous modifications may be made thereto without departing from the spirit and score of the invention.

With the construction of the invention, the following effects can be exhibited.

Since the first aspect of the invention provides the improved connecting mechanism for attaching the movable bracket to the stationary bracket in which the pair of flat pin guide surfaces extending in the axial direction of the steering shaft are provided at the transverse center of the stationary bracket or the movable bracket and the connecting pin that is to be inserted between the pair of pin guide surfaces is provided on the movable bracket or the stationary bracket, the connecting pin is allowed to be guided by the pair of pin guide surfaces in such a manner as to move relatively in the axial directions of the steering shaft. Since the connecting pin is caused to slide by only the pair of pin guide surfaces at the transverse center of the stationary bracket or the movable bracket, the position of the steering wheel can be adjusted smoothly. A smooth adjustment operating feeling can be obtained when the position of the steering wheel is adjusted.

Moreover, since the connecting pin is constructed to be guided by only the pair of pin guide surfaces at the transverse center of the stationary bracket or the movable bracket, the management of the dimensions of the connecting mechanism becomes easy and the number of man hours for the dimensional management can be reduced. As a result, the automotive steering system can be made inexpensive.

Furthermore, there is no need to provide components such as bushes for guiding the connecting pin. Owing to this, the construction of the automotive steering system can be simplified, and the number of components can be reduced. Consequently, the automotive steering system can be made inexpensive.

Since the second aspect of the invention provides the improved connecting mechanism for attaching the movable bracket to the stationary bracket in which the left and right elongate holes extending in the axial direction of the steering shaft and the pair of flat pin guide surfaces extending in the axial direction of the steering shaft between the left and right elongate holes are provided on the stationary bracket or the movable bracket and the connecting pin is provided on the movable bracket or the stationary bracket which is to be inserted between the pair of pin guide surfaces through the left and right elongate holes, the connecting pin can be guided by only the pair of pin guide surfaces in such a manner as to relatively move in the axial directions of the steering shaft. Since the connecting pin is caused to slide by only the pair of pin guide surfaces at the transverse center of the stationary bracket or the movable bracket, the position of the steering wheel can be adjusted smoothly. A smooth adjustment operating feeling can be obtained when the position of the steering wheel is adjusted.

Moreover, since the connecting pin is constructed to be guided by only the pair of pin guide surfaces at the transverse center of the stationary bracket or the movable bracket, the management of the dimensions of the connecting mechanism becomes easy, and the number of man hours for the dimensional management can be reduced. As a result, the automotive steering system can be made inexpensive.

Furthermore, there is no need to provide components such as bushes for guiding the connecting pin. Owing to this, the construction of the automotive steering system can be simplified, and the number of components can be reduced. Consequently, the automotive steering system can be made inexpensive.

According to the third aspect of the invention, since the gap between the pair of pin guide surfaces is made smaller than the width of the left and right elongate holes, there is no need to implement the strict management of the dimensions of the left and right elongate holes required for allowing the connecting pin to pass through the stationary bracket or the movable bracket. Owing to this, machining the elongate holes becomes easy.

According to the fourth aspect of the invention, the pair of pin guide surfaces are the surfaces unitized to be formed on the single pin guide member, and since the pair of pin guide surfaces are constructed to be provided on the stationary bracket or the movable bracket by attaching the pin guide member to the stationary bracket or the movable bracket, the pair of pin guide surfaces can be integrated onto the single pin guide member so that the pair of pin guide surfaces can be preliminarily produced. Owing to this, the management of the dimension between the pair of pin guide surfaces becomes easier. As a result, the production of the pair of pin guide surfaces becomes easier. The productivity of the automotive steering system is also increased.

What is claimed is:

1. An automotive steering system, comprising:
a steering shaft having a steering wheel;
a steering column to which the steering shaft is rotatably attached;
a movable bracket to which the steering column is attached;
a stationary bracket attached to a body of a vehicle; and
a connecting mechanism attaching the movable bracket to the stationary bracket in such a manner that the movable bracket moves back and forth in an axial direction of the steering shaft, whereby the positions of the steering shaft and the steering wheel are adjustable in the axial direction of the steering shaft, the connecting mechanism comprising:
left and right elongate holes extending in the axial direction of the steering shaft and a pair of flat pin guide surfaces also extending in the axial direction of the steering shaft between the left and right elongate holes, said elongate holes and said pin guide surfaces being operatively connected to one of the stationary bracket and the movable bracket; and
a connecting pin operatively attached to the other of the movable bracket and the stationary bracket, the connecting pin being inserted between the pair of pin guide surfaces so that the connecting pin is guided by the pair of pin guide surfaces in such a manner as to be relatively moved in the axial direction of the steering shaft.

2. The automotive steering system according to claim 1, wherein the connecting mechanism further comprises a damper member formed of resilient material located at an end of the pin guide surfaces in the axial direction of the steering shaft.

3. The automotive steering system according to claim 1, wherein said connecting pin is directly provided on the other of the movable bracket and the stationary bracket in direct engagement with the flat pin guide surfaces.

4. The automotive steering system according to claim 1, wherein said connecting mechanism also permits said movable bracket to pivot in a direction substantially perpendicular to said axial direction of the steering shaft.

5. The automotive steering system according to claim 1, further including a pin guide member on which said pin guide surfaces are provided, said pin guide member being connected to said one of the stationary bracket and the movable bracket and extending between said left and right elongate holes.

6. An automotive steering system, comprising:
a steering shaft having a steering wheel;
a steering column to which the steering shaft is rotatably attached;
a movable bracket to which the steering column is attached;
a stationary bracket attached to a body of a vehicle; and
a connecting mechanism attaching the movable bracket to the stationary bracket in such a manner that the movable bracket moves back and forth in an axial direction of the steering shaft, whereby the positions of the steering shalt and the steering wheel are adjustable in the axial direction of the steering shaft, the connecting mechanism comprising:
left and right elongate holes extending in the axial direction of the steering shaft;
a pair of flat pin guide surfaces extending in the axial direction of the steering shaft between the left and right elongate holes, the left and right elongate holes and the pair of pin guide surfaces being provided on one of the stationary bracket and the movable bracket; and
a connecting pin operatively attached to the other of the movable bracket and the stationary bracket, the connecting pin being inserted between the pair of pin guide surfaces through the left and right elongate holes so that the connecting pin is guided by the pair of pin guide surfaces in such a manner as to be relatively moved in the axial direction of the steering shaft.

7. The automotive steering system according to claim 6, wherein a gap between the pair of pin guide surfaces is smaller than each width of the left and right elongate holes.

8. The automotive steering system according to claim 7, wherein the connecting mechanism further comprises left and right expanded portions respectively provided between the left and right elongate holes and the pair of pin guide surfaces, each width of the left and right expanded portions is larger than the each width of the left and right elongate holes.

9. The automotive steering system according to claim 6, wherein the connecting mechanism further comprises a single pin guide member attached to the one of the stationary bracket and the movable bracket, and the pair of pin guide surfaces are surfaces unitized to be formed on the pin guide member, so that the pair of pin guide surfaces are provided on the one of the stationary bracket and the movable bracket.

10. The automotive steering system according to claim 6, wherein the connecting mechanism further comprises a damper member located at an end of the pin guide surfaces in the axial direction of the steering shaft.

11. The automotive steering system according to claim 6, wherein said connecting pin is directly provided on the other of the movable bracket and the stationary bracket in direct engagement with the flat pin guide surfaces.

12. The automotive steering system according to claim 6, wherein said connecting mechanism also permits said movable bracket to pivot in a direction substantially perpendicular to said axial direction of the steering shaft.

13. The automotive steering system according to claim 6, wherein all operative, guided portions of said connecting pin are maintained out of contact with surfaces of the one of the stationary bracket and the movable bracket defining said elongate holes.

14. An automotive steering system, comprising:
a steering shaft having a steering wheel;
a steering column to which the steering shaft is rotatably attached;
a movable bracket to which the steering column is operatively attached;
a stationary bracket operatively attached to a body of a vehicle; and
a connecting mechanism attaching the movable bracket to the stationary bracket in such a manner that the movable bracket is adjustably movable back and forth in an axial direction of the steering shaft, whereby the positions of the steering shaft and the steering wheel are adjustable in the axial direction of the steering shaft, the connecting mechanism comprising:
left and right elongate holes extending in the axial direction of the steering shaft and a pair of flat pin guide surfaces also extending in the axial direction of the steering shaft between the left and right elongate holes, said elongate holes and said pin guide surfaces being operatively connected to the movable bracket; and a connecting pin operatively attached to the stationary bracket, the connecting pin being situated between and guided by the pin guide surfaces of the movable bracket in such a manner as to permit adjustable movement of the movable bracket in the axial direction of the steering shaft.

15. The automotive steering system according to claim 14, wherein said connecting mechanism also permits said movable bracket to be pivotally adjustable in a direction substantially perpendicular to said axial direction of the steering shaft.

16. The automotive steering system according to claim 14, wherein the connecting mechanism further comprises a damper member formed of resilient material located at an end of the pin guide surfaces in the axial direction of the steering shaft.

17. The automotive steering system according to claim 14, further including a pin guide member on which said pin guide surfaces are provided, said pin guide member being connected to said movable bracket and extending between said left and right elongate holes.

* * * * *

UNITED STATES PATENT AND TRADEMARK OFFICE
CERTIFICATE OF CORRECTION

PATENT NO. : 6,964,432 B2
DATED : November 15, 2005
INVENTOR(S) : Morita et al.

It is certified that error appears in the above-identified patent and that said Letters Patent is hereby corrected as shown below:

Column 7,
Line 1, change "pin guide surface 81," to -- pin guide surfaces 81, --.
Lines 4 and 5, change "provided on the stationary bracket 41, and the connecting pin 61 is provided on the stationary bracket 31 for insertion" to -- provided on the stationary bracket 31 for insertion --.

Column 13,
Line 61, change "steering shalt and the steering wheel" to -- steering shaft and the steering wheel --.

Signed and Sealed this

Second Day of May, 2006

JON W. DUDAS
*Director of the United States Patent and Trademark Office*